Jan. 24, 1967   A. STAMBERA ETAL   3,299,975
CONVEYOR CONTROL WEIGHING APPARATUS
Filed Sept. 16, 1964   2 Sheets-Sheet 1
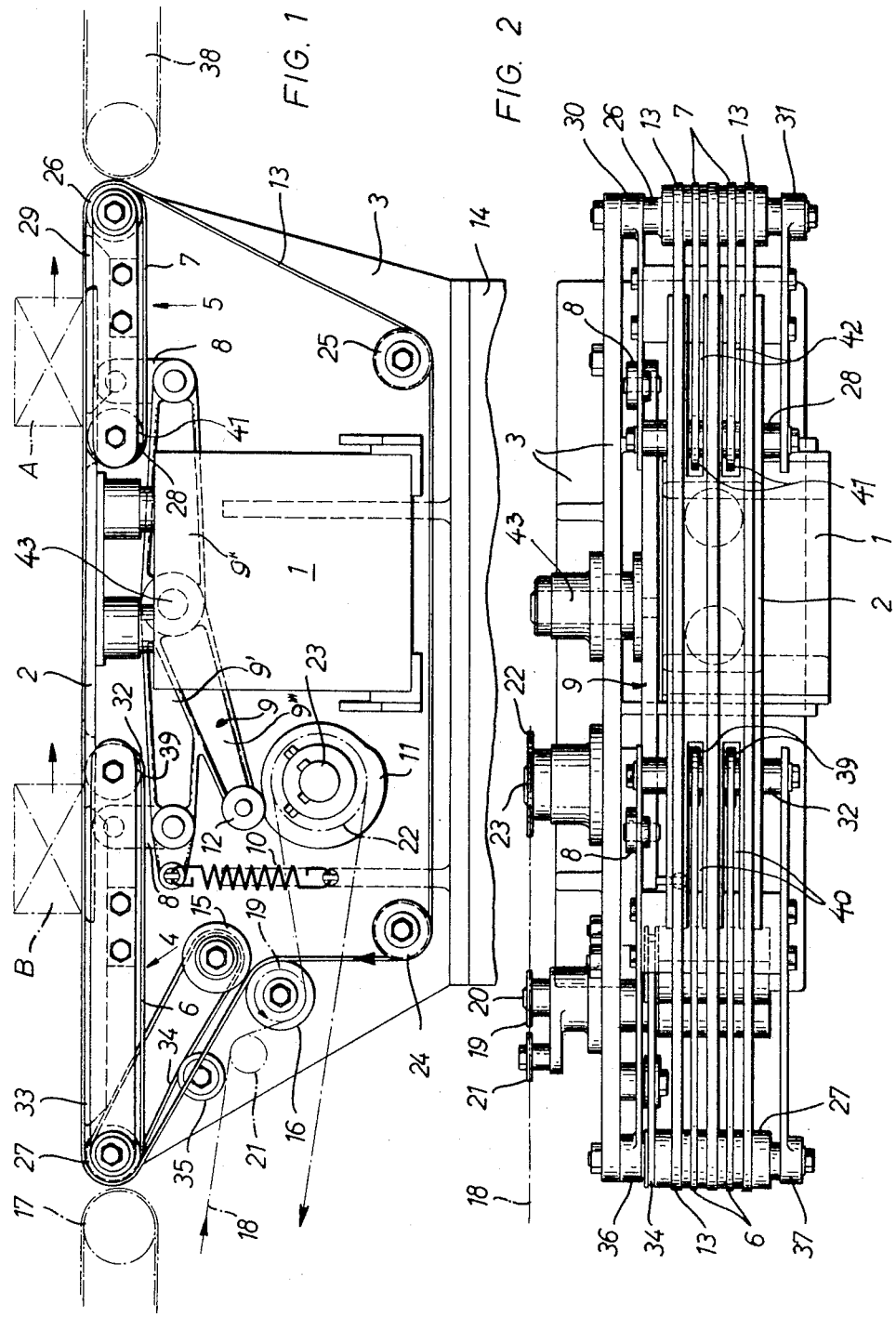

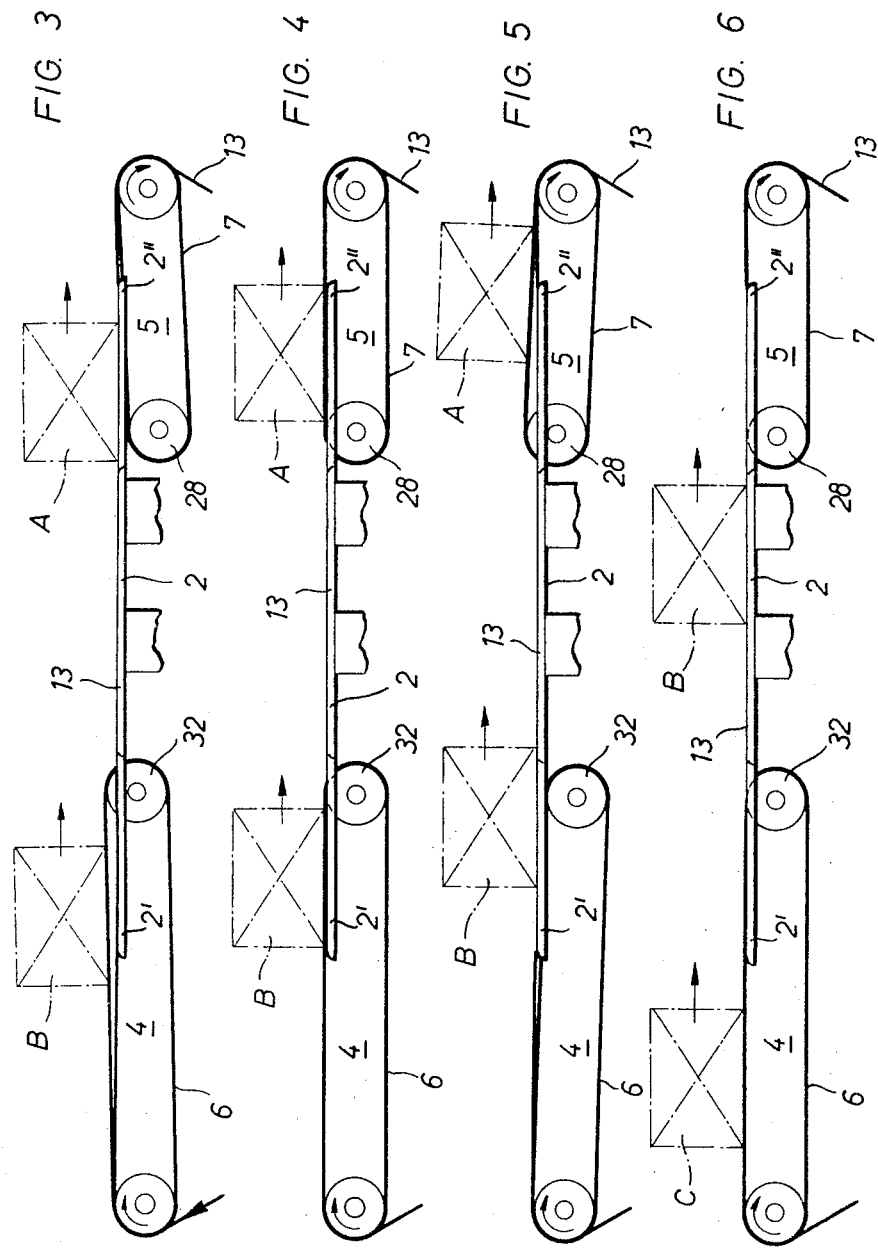

United States Patent Office 3,299,975
Patented Jan. 24, 1967

3,299,975
CONVEYOR CONTROL WEIGHING APPARATUS
Adolf Stambera and Bruno Cap, both of Stuttgart-Bad Cannstatt, Germany; said Stambera assignor to Fr. Hesser Maschinenfabrik-Aktiengesellschaft, Stuttgart-Bad Cannstatt, Germany, a corporation of Germany
Filed Sept. 16, 1964, Ser. No. 396,924
Claims priority, application Germany, Oct. 21, 1963, H 50,601
5 Claims. (Cl. 177—52)

This invention relates to a control weigher in which packages to be weighed are fed to a weighing table and conveyed away from this table after the weighing operation has taken place.

Control weighers are known in which the packages are brought periodically by means of grippers or the like to the weighing table and subsequently removed from the latter. The rate of output of such devices is, however, comparatively small because of their construction and mode of operation.

Other known proposals rely on the feeding of the packages to be weighed by means of one or more side-by-side conveyor belts or the like, running at a uniform speed over the weighing table, weighing taking place in the course of this conveyor. This does make a considerable increase in output possible, particularly when spring weighers are used. In this type of system, however, the amount of time available for the weighing is dependent on the one hand on the spacing with which the individual and successive packages are delivered, and also on the speed of delivery and the package length measured in the direction of conveyance. However, the package length, like the time which is required for the actual weighing procedure, cannot be freely chosen but are proscribed by the weighing system. Thus, only the rate of feed can be increased, that is to say, the packages moved as quickly as possible over the weigher, to keep to a minimum the periods required for the shifting of packages from the feed conveyor belt to the weighing table and then from the latter to the delivery conveyor belt. An increase in the conveying speed, however, in turn requires an elongation of the weighing table because, as has already been mentioned, the weighing does call for a specific minimum period during which the package to be weighed must be located on the table. The potential length of such weighing tables is, however, compartively closely restricted if weighing accuracy is desired and this, therefore, restricts the upward limit of output of such weighers.

It is an object of this invention to provide an improved system in which the period required for transfer to and from the weighing table is substantially reduced.

A further object is a weigher construction in which there is provision for coordinated deposition and take off of successive weigh loads at rapid intervals.

Yet another object is to equip the weigher with feed and discharge conveyor devices in the form of weigher bridges which are organised for ascent and descent in relation to the weighing table and which overlap the respective ends of this table, whereby the feed conveyor device first shifts a package over the end of the weighing table, without actually contacting the latter, and then lowers it on to this table, whilst the discharge conveyor device is lifting off a preceding weighed package from the weighing table.

This achieves the result that the packages are deposited quickly and in optimum weighing posture on the weighing table and removed with similar efficiency, and this only requires a fraction of the time which hitherto has been needed to push the packages along in the transit direction.

A preferred construction of control weigher according to the invention is described in more detail hereafter in reference to the accompanying diagrammatic drawings, in which:

FIGURE 1 is the side view of the control weigher;
FIGURE 2 is a plan view of the assembly seen in FIGURE 1, and
FIGURES 3 to 6 are diagrammatic illustrations of the upper part of the control weigher showing packages in various phases of a weighing operation.

The weigher illustrated comprises a frame 3 mounted on a pedestal 14, of which a part only is shown, and supporting a weighing cell 1 carrying a weighing table 2 and containing weighing mechanism of a type known per se.

Packages to be weighed are delivered by a supply device 17, in this case shown as comprising an endless conveyor belt, from a packaging machine, and weighed packages are delivered away from the control weigher through a delivery device 38, again shown in the form of an endless belt conveyor. Between the supply conveyor 17 and the delivery conveyor 38 the packages will be transferred on to the table 2 and traversed along the latter during the time that they are being weighed. For this purpose use is made of a plurality of side-by-side belts 13 the upper run of which passes over the weighing table 2, these belts passing round end rollers 27 and 26 and further guide rollers 24 and 25 mounted on the frame 3 at a lower level.

The belts 13 are desirably driven at a speed coordinated with the rate of supply of packages to the weigher, and for this reason the drive is effected between a driving roller 16 and a pinch roller 15 both rotatably mounted on the frame 3. The shaft of roller 16 carries a chain wheel 19 which is in mesh with a chain 18 driven from the package machine at a rate coordinated with the delivery of packages therefrom to the weigher, this chain passing over an idler sprocket 21, to amplify the angular range of engagement of the chain with the chain wheel 19, and over a further sprocket 22 carried by the shaft 23 of a cam 11, the function of which will later be referred to.

In accordance with the principles of the present invention, to minimise the interval between the deposition of two successive packages on the weighing table 2 use is made of feed and discharge devices respectively for transferring successive packages from the supply conveyor 17 to the table 2 and from this table to the delivery conveyor 38. These feed and discharge devices comprise similar bridging units which have respectively been identified as 4 and 5 in the accompanying drawings. Referring first to the bridging unit 4, this comprises a pair of endless belts 6 which run around a pair of end rollers, the first of which is the roller 27, whilst the second is a reversing roller 32 which is supported from the shaft of roller 27 by a pair of side cheeks 36, 37 which overlap the adjacent and run-on end of table 2. In fact the belts 6 run over collars 39 of roller 32 which, like the overlapping upper runs of belts 6, can pass through slots 40 in the run-on ends of table 2. The shaft of roller 32 is clamped in longitudinal slots (not shown) in the side cheeks 36, 37 to enable it to be adjusted for tensioning of belts 6. A pair of guide rails 33 for the belts 6 are mounted between the cheeks 36 and 37.

The belts 6 are driven from the roller 27. As will be explained below, this roller 27 is not to be drawn by belts 13, and consequently is rotated by a belt 34 disposed around the pinch roller 15. This roller is covered with a resilient frictional lining, which not only assists the driving of the main belts 13 but also provides for a derivative drive to the roller 27. A jockey roller 35 is used to tension the belt 34.

The bridging unit 5 is similar to unit 4, but is arranged at the other end of the weigher and is of shorter length than unit 4. Again it comprises a pair of parallel endless belts 7 running over the roller 26 and a reversing roller 28. This latter is rotatable between side cheeks 30, 31 which are pivotable on the shaft of the roller 26. Again, the ends of the shaft of roller 28 are clamped in slots in the cheeks 30, 31 to allow for adjustment for belt-tensioning purposes, and these side cheeks 30, 31 serve to mount guide rails 29 for belts 7 between them. Further, the belts 7 are actually guided over collars 41 of roller 28 which can pass through slots 42 in the run-off ends of table 2. Thus it will be observed that both the units 4 and 5 are mounted so as to be pivotable, each as a body, about fulcra provided by their end rollers 27 and 26. In the case of bridging unit 5 the belts 7 of this unit are impelled by the rotation of the roller 26, which is frictionally driven by the main conveyor belts 13. In the case of bridging unit 4, however, it is desirable that the belts 13 shall run slack over roller 27 to avoid tensioning of the upper run of belts 13, at the part where they are to move the packages into contact with the weighing table 2 and over the latter, such as might interfere with the proper "loading" of the table. It is for this reason that a separate drive is imparted to the belt 6 of unit 4 through the roller 15 and belt 34, but it will be observed that this also is conjugated with the drive of the main belts 13.

The side cheeks 30 and 36 of the two bridging units 5 and 7 are, it will be noted, coupled by links 8 to a three-armed lever 9. From FIGURE 1 it will be observed that two arms 9' and 9" of this lever are aligned and symmetrically disposed at either side of the pivot 43 of lever 9 on the frame 3. The third arm 9''' of the lever 9 is downwardly inclined and equipped at its end with a roller 12 which runs on the edge of cam 11. The edge of this cam is designed to produce a movement of lever 9 suchwise as to bring about a rocking of the units 4 and 5 about their fulcra, but in opposite direction and in sympathy with the feed of the packages (by virtue of the common drive shared by cam 11 and drive roller 16 through the chain 18). The roller 12 is biassed into permanent engagement with cam 11 by a tension spring 10.

The movement of successive packages through the system and the relative actions of units 4 and 5 are analysed in more detail in FIGURES 3 to 6, to which reference will now be made.

In FIGURE 3 a package B is shown reaching the run-on end 2' of the table 2 whilst a preceding package A is about to leave this table. At the stage illustrated in FIGURE 3 the lever 9 has pivoted the unit 4 so that the upper run of belts 6 is above the underlying part of the belts 13 on table portion 2', whilst at the same time the unit 5 has been depressed so that the belts 7 thereof are below the run-off end 2" of the table. Package B is still carried by the belts 6 of unit 4, whilst the package A is moving over the table 2 under the impulsion of belts 13.

FIGURE 4 illustrates the next phase, in which unit 4 has been pivoted down and is at the point at which the belts 6 thereof are depositing the package B for the latter to be taken over and advanced by belts 13 across the table. At the same time the unit 5 is being pivoted upwards and the belts 7 thereof are about to take off the package A from the table and belts 13.

FIGURE 5 shows the succeeding phase in which the unit 4 is still pivoting downwards and the package B has been further advanced over table 2 by belts 13. In contrast the unit 5 has been pivoted up and carried off the package A.

Finally, FIGURE 6 shows the situation in which the package B is at the weighing point on table 2 and is being weighed whilst in transit, the unit 6 has received a fresh package C from the supply conveyor 17 and has been pivoted back into neutral position, whilst the package A has been discharged from unit 5 on to the delivery conveyor 38 and this unit 5 is returning to the neutral position to receive the oncoming package B.

From this it will be observed that the amount of time spent by a package in the actual weighing phase is reduced to the minimum required for accurate weighing, and the substitution of one package by the next is effected rapidly, this greatly increasing the through-put of the weigher.

It will be appreciated that modifications can be made in the apparatus described within the purview of this invention as comprehended within the ensuing claims. For example the arrangement and number of side-by-side belts 6, 7 and 13 can vary from the details illustrated in the drawings, to cater for example for different sizes of packages. Again, although conveyor belts have been illustrated, it will be appreciated that links or other forms of conveyor can be employed in their place.

Again, instead of deriving the drive for these mechanisms from the supply packaging machines, it will be appreciated that other methods of drive can be employed, for example use may be made of a special motor on the frame 3 for driving the various conveyor belts. Yet again, the mechanism for raising and lowering the bridging units 4, 5 can be modified, and may be performed by the direct or indirect impulsion from a package segregating device which prepares the packages and is arranged in advance of the weigher. Yet another possibility is the arrangement of the conveyor bridging units 4, 5 so that they are movable up and down in rectilinear guideways. Further, the unit 4 may form part of a segregation device with the conveyor means thereof, when in the rest or neutral position, constituting an abutment edge for packages to be weighed.

We claim:

1. A control weigher comprising a main frame, a weighing mechanism mounted on said main frame, a weighing table operatively associated with said weighing mechanism, main conveyor means running over said table for the transport of objects along this table with simultaneous weighing thereof, means for driving said main conveyor means, feed and discharge devices mounted on said main frame and having parts overlapping the respective ends of said table and movable relatively to the latter, and a control mechanism coupled to said feed and discharge devices and operable to cause the alternate lifting of at least the said overlapping part of one of the said feed and discharge devices whilst causing the lowering of at least the said overlapping part of the other of said devices, whereby one object to be weighed can be lowered on to the table and conveyor means, for weighing whilst a preceding and weighed object is lifted off the same and removed.

2. A control weigher comprising a main frame, a weighing mechanism mounted on said main frame, a weighing table operatively associated with said weighing mechanism, main conveyor belt means running over said table for the transport of objects along this table with simultaneous weighing thereof, a supply conveyor at one end of said table, a delivery conveyor at the other end of said table, feed and discharge devices in the form of bridging units between the supply and delivery conveyors and the respective ends of said table, said feed and discharge units have parts overlapping these ends of the table and movable through gaps in these ends, and a control mechanism coupled to said feed and discharge devices operable to cause the alternate lifting of at least the said overlapping part of one of said feed and discharge devices whilst causing the lowering of at least the said overlapping part of the other of said devices, whereby one object to be weighed can be lowered on to the table and conveyor means for weighing whilst a preceding and weighed object is lifted off the same and removed.

3. A control weigher as claimed in claim 1, in which the feed and discharge devices comprise endless belt conveyors and at least one driving roller for each of these conveyors, means being provided to rotate said driving rollers from said main conveyor driving means at a rate dependent on the rate of travel of said main conveyor means.

4. A control weigher according to claim 2 in which each of said feed and discharge devices is rockable about a point away from the related end of the table, and the control mechanism comprises a lever and linkage system and means for actuating this system in timed relationship with the drive of said main conveyor means.

5. A control weigher comprising a main frame, a weighing mechanism mounted on said main frame, a weighing table operatively associated with said weighing mechanism, main conveyor belt means running over said table for the transport of objects along this table with simultaneous weighing thereof, a supply conveyor at one end of said table, a delivery conveyor at the other end of said table, feed and discharge devices in the form of bridging units between the supply and delivery conveyors and the respective ends of said table, each of said feed and discharge devices comprising endless belts movable around a pair of end rollers on a bridging frame pivoted on said main frame, each said bridging frame overlapping the adjacent end of the weighing table and being pivotable to raise and lower the corresponding endless belts above and below the table, and the main conveyor means running thereover, through gaps in the ends of the table, and a control mechanism coupled to said feed and discharge devices and operable to cause the alternate lifting of at least the said overlapping part of one of said feed and discharge devices whilst causing the lowering of at least the said overlapping part of the other of said devices, said control mechanism comprising a lever and linkage system coupled to said bridging frames, and a cam driven by said main conveyor driving means to operate said system, whereby one object to be weighed can be lowered on to the table and conveyor means for weighing whilst a preceding and weighed object is lifted off the same and removed.

References Cited by the Examiner

UNITED STATES PATENTS 2,597,069   5/1952   Conti _____ 177—52

RICHARD B. WILKINSON, *Primary Examiner.*